United States Patent Office 3,093,030
Patented June 11, 1963

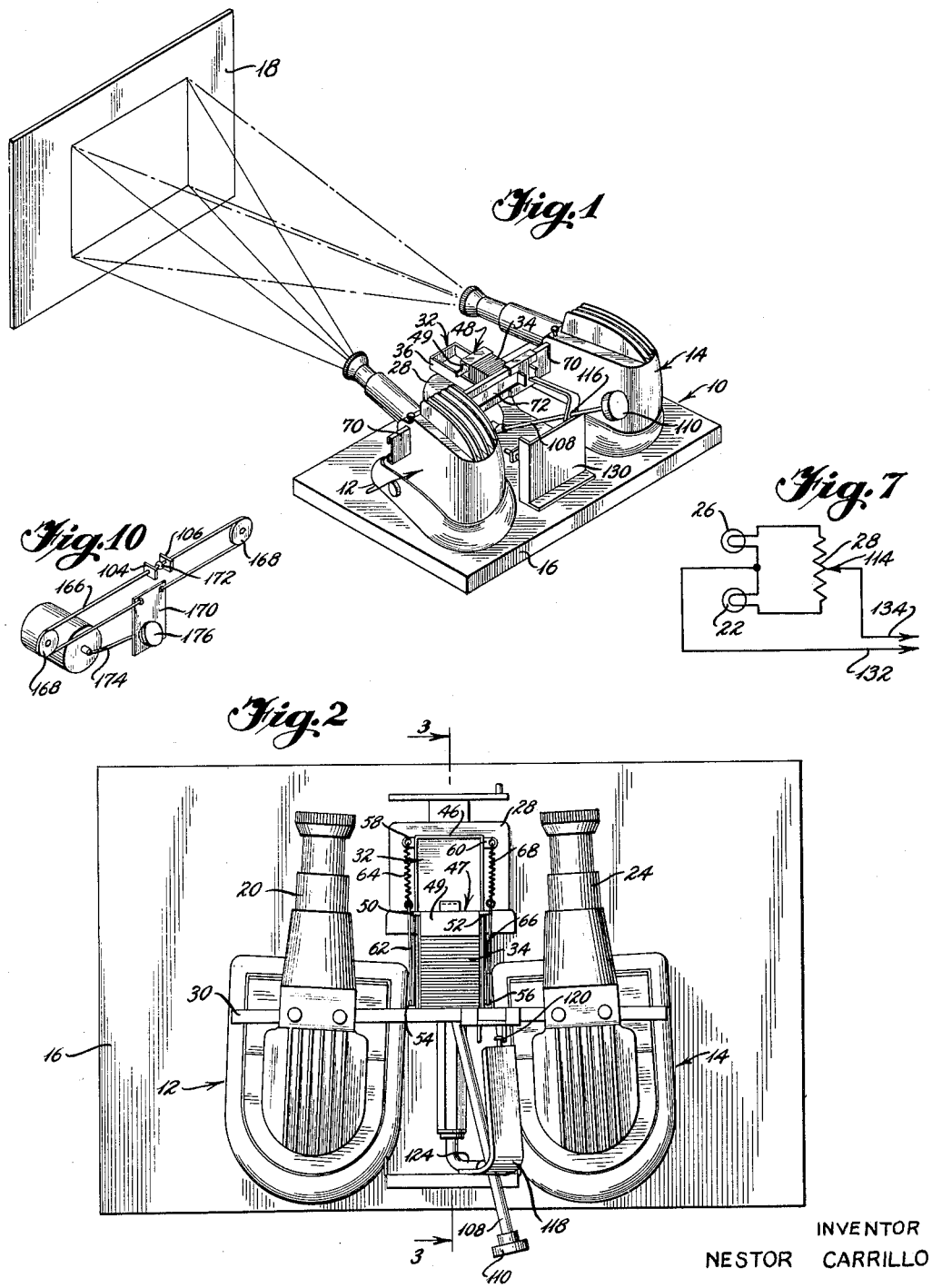

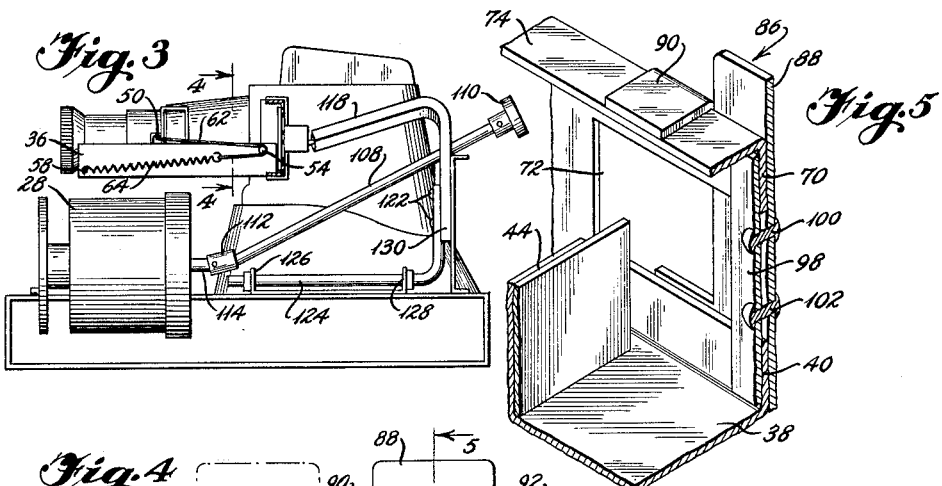
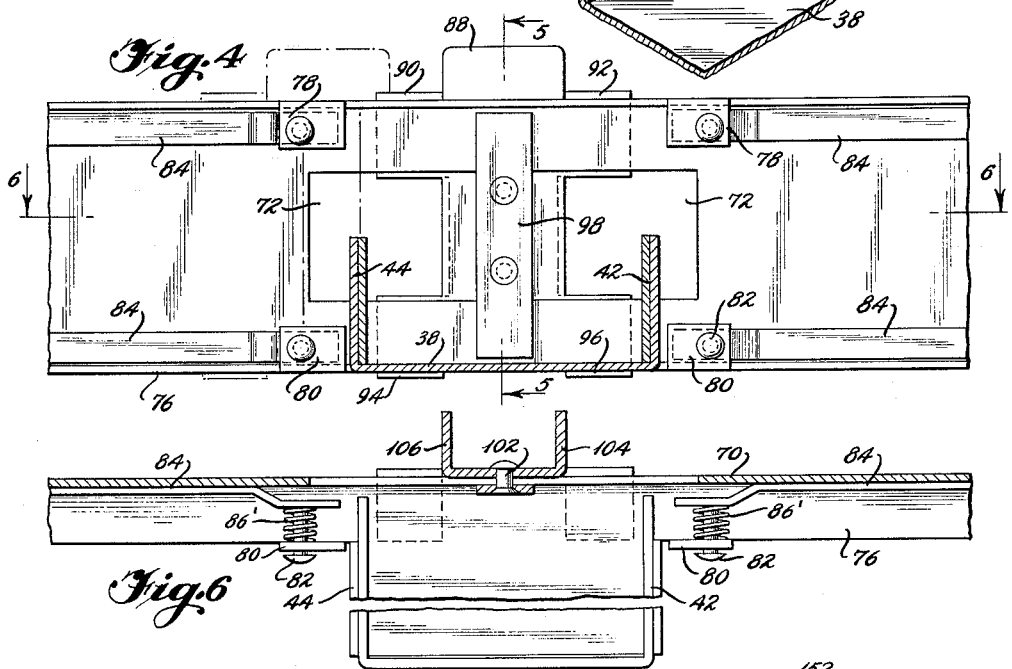
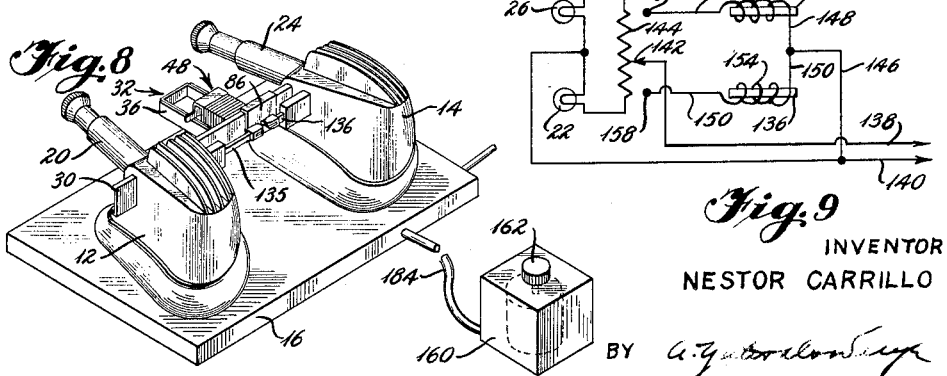

3,093,030
SLIDE PROJECTOR WITH DISSOLVE
Nestor Carrillo, Holland St., Langley Forest, McLean, Va.
Filed Feb. 9, 1959, Ser. No. 792,045
3 Claims. (Cl. 88—28)

The invention relates generally to the class of still picture or slide projectors. More particularly, the invention relates to a slide projector comprising two interdependent projecting units and having apparatus for simultaneously dissolving a picture projected by one projecting unit and developing in its place a picture projected by the adjacent projecting unit and feeding successive slides alternately to the two projecting units.

Heretofore, slide projectors have been provided with apparatus for simultaneously closing off the light aperture in one projecting unit and opening the light aperture of an adjacent projecting unit. Many such devices have employed mechanical linkages for actuating screen or leaves to move in front of and away from the light apertures located adjacent the illuminating light bulbs. Such mechanical linkages require adjustment and replacement of parts.

Further, in the use of some prior projectors having only one projecting unit, there are periods of total darkness of the viewing screen during the transition from one slide to the next. This breaks the continuity of the program being presented and is unpleasant to the viewers or audience.

Further, in many prior projectors, a separate mechanism has been required for feeding slides to each projecting unit.

It is an object of the invention to overcome the disadvantages of prior devices and provide a multiple slide projector having apparatus for simultaneously darkening the light source or bulb of one projecting unit and lighting the bulb of the adjacent projecting unit by means of a device that gradually reduces and increases the amount of electricity that activates the light source of each projecting unit.

It is a further object of the invention to provide a multiple slide projector having a single control knob for synchronously and gradually darkening the light source of one projecting unit and simultaneously lighting the light source of the adjacent projecting unit and feeding successive slides alternately to each of the two projecting units, hereinafter sometimes called "units."

It is a further object of the invention to provide a variable resistance for gradually decreasing the electrical current through the light bulb or source of one projecting unit while simultaneously increasing the electrical current through the light bulb of the adjacent unit so that one image gradually fades from the viewing screen as the other image gradually appears.

Another object of the invention is to provide a dual slide projector having apparatus for gradually changing the images appearing on the viewing screen without any periods of total darkness or absence of any image on the viewing screen.

Another object of the invention is to provide a multiple slide projector having a single operating control by which the operator can gradually electrically dissolve one image and gradually electrically develop the next image on the screen and also feed the next slide into position for projection.

Another object of the invention is to provide a multiple slide projector having a remote control panel from which the operator can, by manipulating a single operating control knob, gradually electrically dissolve one image from the viewing screen while gradually electrically developing the next image on the screen and also upon having fully developed one image and fully dissolved the other, automatically feed the next slide into position in darkened projecting unit for viewing when the control knob is reversed.

Other and further objects and advantages of the invention will be apparent as the description proceeds and upon reference to the drawings wherein:

FIG. 1 is a perspective of a dual slide projector according to the invention;

FIG. 2 a top plan view to an enlarged scale of the dual slide projector illustrated in FIG. 1;

FIG. 3, a vertical section on the line 3—3 of FIG. 2;

FIG. 4, a fragmentary vertical section on the lines 4—4 of FIG. 3 and showing the track in which the slides move;

FIG. 5 a fragmentary perspective taken on the line 5—5 of FIG. 4;

FIG. 6, a horizontal section taken on the line 6—6 of FIG. 4;

FIG. 7, a schematic diagram of the electrical circuit employed in the dual slide projector illustrated in FIGS. 1 to 6;

FIG. 8, a perspective of an alternative embodiment of the invention;

FIG. 9, a schematic diagram of an electrical circuit employed in the dual slide projector illustrated in FIG. 8; and FIG. 10, a fragmentary perspective of a further embodiment of the invention employing a different slide feeding mechanism.

Briefly stated, the present invention includes a slide projector with two projecting units, each with its own and independent bulb or light source and lenses, and having a single common control mechanism for gradually electrically darkening the light source of one projecting unit and simultaneously gradually electrically lighting that of the adjacent projecting unit, by means of a single variable resistance, powerstat or rheostat and feeding the next slide from a single magazine into position in the corresponding unit to be subsequently viewed. Two projecting units such as described above are mounted adjacent to each other and positioned to cast superimposed images or pictures in the same space on the viewing screen. An electrical circuit supplies current to the light source or bulbs in each projecting unit to project its image on the viewing screen. A rheostat is mounted in the circuit to supply current to the two light sources alternatively. By operation of the rheostat, current is supplied to one bulb or light source and gradually increased while the current supplied to the other bulb or light source is simultaneously decreased gradually and the bulb turned off. A single operating control is provided to manipulate the variable resistance, hereinafter called rheostat, and to feed the next slide from a stack of slides in a magazine to a position for subsequent projection on the viewing screen.

The feeding of the successive slides from the stack in the magazine can be accomplished mechanically or electrically.

For feeding mechanically, the operating control for manipulating the rheostat is also arranged to actuate a slide advancer to push the next succeeding slide from the stack in the magazine into position for projection and to displace the previously viewed slide, all this while the adjacent projecting unit is projecting a slide on the screen.

When the feeding is accomplished electrically, the rheostat includes contacts for alternately closing electrically operated devices connected to the slide advancer. The slide advancer is thereby moved alternately in opposite directions to push the next succeeding slide from the stack in the magazine, which displaces the previously-viewed slide from projection position.

Referring to FIGS. 1 to 7, a slide projecting machine 10 includes a pair of projecting units 12 and 14 mounted on a base 16 and positioned so that the projected images of both units converge at the same area on a viewing screen 18. Projecting unit 12 includes a barrel 20, conventional lenses, an illuminating incandescent electric bulb 22, seen in FIG. 7, and a cooling fan (not shown). Similarly, the projecting unit 14 includes a barrel 24, conventional lenses, an illuminating incandescent electric bulb 26, seen in FIG. 7, and a cooling fan (not shown). A variable resistance or rheostat 28 is connected, in a manner to be described, to alternatively gradually supply current to the bulbs 22 and 26.

A slide track 30 extends between the projecting units 12 and 14 for receiving and feeding slides from a stack 34 in a slide magazine 32. Mechanism, hereinafter described, is provided for operating the rheostat 28 and feeding slides from the magazine 32 alternately to each of the projectors 12 and 14.

The magazine 32 includes a tray 36 having a bottom 38, an upturned front end 40, double thickness sides 42 and 44, as seen in FIGS. 4 and 5, and a rear end 46. A slide follower 47 engages the rear of the slide stack 34 and is spring-pressed to urge the slide stack 34 toward the slide track 30.

The slide follower includes a vertical plate 48 for pressing against the rear of the slide stack 34 and a horizontal upper lip 49 extending over the top of slides and serving to maintain the slides in proper position in the tray 36. Ears 50 and 52 extend outwardly from opposite sides of slide follower 47. Similarly, ears 54 and 56 extend outwardly from the forward ends of sides 42 and 44 and ears 58 and 60 extend outwardly from the rearward ends of sides 42 and 44 of tray 36. All the ears 50, 52, 54, 56, 58 and 60 have eyelets formed therein. A flexible cord 62, which can be formed of plastic, is secured to ear 50, passes through the eyelet in ear 54, and is secured to one end of a tension spring 64 having its opposite end secured to ear 58.

Similarly, on the opposite side of the tray 36, a flexible cord 66 is secured to ear 52, passes through the eyelet in ear 56, and is secured to one end of a tension spring 68 having its opposite end secured to ear 60.

Slide track 30 extends from projecting unit 12 to projecting unit 14 and includes a vertical back 70 with an aperture 72 formed therein. The slide track 30 also includes a top horizontal portion 74 and a bottom horizontal portion 76. Top horizontal portion 74 partially extends over tray bottom 38 to insure that the slides being fed into the slide track arrive in proper position. Vertical plates 78 extend downwardly from top horizontal portion 74. Vertical plates 80 extend upwardly from bottom horizontal portion 76. Rivets 82 extend through holes in the vertical plates 78 and 80 and have their ends secured to slide presser bars 84. Helical compression springs 86' surround the rivets 82 and urge the presser bars 84 to press the slides against the vertical back 70 of slide track 30 to insure proper feeding of the slides to the projecting units 12 and 14. While only one end of the presser bars are shown in FIGS. 4 and 6, there are similar rivets and springs at the opposite ends of the presser bars to provide stable support and uniform pressing of the bars.

A slide advancer 86 is reciprocatively mounted on slide track 30 and is adapted to advance the slides from stack 34 alternately to projecting units 12 and 14. The slide advancer 86 includes a back plate 88 having top horizontal flanges 90 and 92 and oppositely-disposed bottom horizontal flanges 94 and 96 between which the slide track is received. In order to hold the back plate 88 in sliding contact with the slide track and to engage the slides, a pusher plate 98 is connected to back plate 88 by rivets 100 and 102 that extend through aperture 72. Vertical flanges 104 and 106 extend outwardly from back plate 88 for engagement by actuating mechanism hereinafter described.

An operating rod 108 having a control knob 110 is provided for producing the reciprocation of slide advancer 86 and for controlling the rheostat 28 to vary the supply of current between bulbs 22 and 26. The rod 108 is connected through a universal joint 112 to a sliding shoe 114 of the rheostat 28. Rotation of the control knob 110 will thus rotate rod 108 and sliding shoe 114 to increase gradually the supply of electricity and thereby the brightness of one of the light bulbs and simultaneously decrease gradually the supply of electricity and thereby the brightness of the other.

The following mechanism is provided so that pivoting of the operating rod 108 will produce feeding of the slides along the slide track 30. The operating rod 108 extends through an aperture 116 in a V-shaped bar 118 having a stud 120 extending from its free end into a position between vertical flanges 104 and 106 on slide advancer 86. The V-shaped bar 118 is rigidly connected by rivets 122 to the vertical portion of an L-shaped rod 124 rotatably journaled in brackets 126 and 128 secured to the base 16. Vertical plate 130 is secured to base 16 and provides a support for the end of operating rod 108. Referring to FIG. 7, an appropriate electrical voltage is applied across the lines 132 and 134.

The operation of the embodiment of the invention illustrated in FIGS. 1 to 7 will now be described. A stack of slides 34, arranged in the order desired for viewing, is placed in tray 36 of slide magazine 32. Next, operating rod 108 is pivoted about universal joint 112 to rotate V-shaped bar 118. The stud 120, extending from the end of V-shaped bar 118, engages one of the flanges 104 or 106 to move slide advancer 86 toward one of the projectors 12 or 14. It will be seen that there is some lost motion as the stud 120 moves from one of the flanges 104 or 106 to the other. The front pusher plate 98 engages the slide that is at the head of the stack 34 and moves the slide along slide track 30. The slide is held against vertical back 70 by presser bars 84. By repeating this procedure, the slide advancer 86 is reciprocated until both projectors have slides in projecting position.

Next, the control knob 110 is rotated to move the sliding shoe 114, as seen in FIG. 7, so that substantially no current will flow through the bulb 22 but maximum current will flow through bulb 26. The electric power is supplied to leads 132 and 134 so that bulb 26 is illuminated to cast the image or picture of the slide in projecting unit 14 upon the viewing screen 18. After this slide has been viewed, the knob 110 is rotated to rotate rod 108 and move sliding shoe 114 along the variable resistor to the point where maximum current flows through bulb 22 and substantially no current flows through bulb 26. Bulb 22 becomes bright while bulb 26 becomes dark. As the sliding shoe 114 is moved, the image upon the screen 18 from projecting unit 14 is gradually replaced by the image cast by projecting unit 12. There is no period of total darkness but rather a gentle transition of images with substantially constant brightness upon the viewing screen 18.

Thereafter, the operating rod 108 is pivoted to rotate V-shaped bar 118 and move slide advancer 86 to move a new slide into projecting unit 14 which at this moment has its bulb dark, and eject the previously-viewed slide from projecting unit 14 via the open end of slide track 30. After the slide in projecting unit 12 has been viewed, the rheostat 28 is again operated as above to gradually dissolve the image projected from projecting unit 12 and develop the image of the slide in projecting unit 14. This process of gradually changing images cast upon screen 18 and feeding succeeding slides to the projecting units is repeated until all the slides in magazine 32 have been viewed.

Referring to FIGS. 8 and 9, an alternative embodiment is illustrated wherein like reference numerals designate like elements. This embodiment differs from that illustrated in FIGS. 1 to 7 in that the slide advancer 86 is reciprocated by an electrically operated mechanism, that illustrated constituting solenoid armatures 135 and 136 that are connected to the slide advancer 86 and extend in opposite directions therefrom. Referring to FIG. 9, appropriate electrical power is applied to the leads 138 and 140. Lead 138 extends to sliding shoe 142 which engages variable resistor 144 of a rheostat or potentiometer. Lead 146 is connected to leads 148 and 150 which extend to solenoid coils 152 and 154 that surround armatures 135 and 136 respectively. Lead 148 terminates in contact 156 adapted to be engaged by sliding shoe 142. Similarly lead 150 terminates in contact 158 adapted to be engaged by sliding shoe 142. The rheostat or potentiometer including sliding shoe 142, variable resistor 144, and contacts 156 and 158 are located in remote control box 160 shown in FIG. 8. Knob 162 operates the sliding shoe 142. Cable 164 extends from the box 160 to the base 16 and contains the necessary electrical leads.

In the operation of the projecting machine illustrated in FIGS. 8 and 9, the dissolving of the image from one projector and developing of the image from the other projector and the feeding of the successive slides along the slide track 30 are all accomplished by rotation of the control knob 162. When the control knob has been rotated to dissolve completely one image and develop completely the other the sliding shoe engages alternatively one of the contacts 156 and 158. This causes the completion of the circuit through one of the solenoids 152 and 154. Thereupon one of the armatures 135 or 136 is drawn within the solenoid and the slide advancer 86 is moved to feed a slide along the slide track 30 into the projecting unit whose bulb is then dark. It will be seen that the remote control box 160 can be conveniently operated from an armchair while the projector rests on a convenient table at the rear of the projecting room.

Referring to FIG. 10, a further embodiment of the invention is illustrated. The projector is constructed like that shown in FIGS. 1 to 7 except that slide advancer 86 is reciprocated by a pulley mechanism including a flexible line 166 passing around a pair of pulleys 168 rotatably mounted adjacent each of the projecting units 12 and 14. The free ends of the line 166 are secured to a plate 170. The line 166 extends through apertures in the vertical flanges 104 and 106 extending from the slide advancer 86. For simplicity, only the vertical flanges of the slide advancer are shown in FIG. 10. An enlarged bulb 172 is secured to the line 166 at a position intermediate the vertical flanges 104 and 106. The bulb 172 is larger than the apertures in the vertical flanges and thus serves to engage one of the vertical flanges 104 and 106 when the line 166 is reciprocated and thereby move slide advancer 86. The operating wire or rod 174 having a control knob 176, extends through an aperture in plate 170 and engages the rheostat (not shown). The operating rod can be formed of metal cable having sufficient flexibility that the universal joint illustrated in the embodiment of FIGS. 1 to 7 can be eliminated.

The operation of the embodiment of the invention illustrated in FIG. 10 is similar to the operation of the previously described embodiments. Rotation of knob 176 operates the rheostat to dissolve the image from one projecting unit and develop the image from the other projecting unit. Reciprocation of the knob 176 moves plate 170 toward and away from the pulleys. The enlarged bulb 172 alternately engages the flanges 104 and 106 and the slide advancer 86 feeds a slide toward one of the projecting units.

Thus, it will be seen that the invention provides a slide projecting machine having two projecting units and a single column operating means for gradually simultaneously dissolving the image from one projecting unit and developing the image from another projecting unit and successively feeding slides in their desired order of viewing to the units.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. Projecting equipment comprising a pair of projectors arranged in close adjacent relation for projection on a common screen, each projector having an electric light source, a magazine positioned closely adjacent said projectors with the slides carried by the magazine in position for insertion in the projectors, slide feed means for sequentially moving each alternate slide from the magazine to one projector and each other slide to the other projector, said means to feed alternate slides to one projector and the other slides to the other projector being operable in sequence, a single operating handle mounted for two distinct movements, means operably connected to said single operating handle and operable by movements of said single operating handle according to one of said distinct movements for moving said slide feed means to feed slides to said projectors, control means for alternately making the light of the one projector bright while dimming the light of the other projector and alternatively making the light of the other projector bright while dimming the light of said one projector, said control means being operably connected to said single operating handle for operation according to the other of said distinct movements of said single operating handle different from the movement to operate said means to feed slides for controlling the brightness of said lights and being operable so that when the slides in said projectors are stationary said lights are dimmed and brightened, and said slides are changed in the projector which has the darkened light whereby moving images on said screen may be completely avoided and complete darkness of the screen is avoided, the comfort level of the audience being kept substantially uniform without wide variations in light intensity.

2. The invention according to claim 1 in which the single operating handle is a knob on a rotatable shaft and the shaft is movable about an axis transverse thereto.

3. The invention according to claim 1 in which the single operating handle is rotatable and is movable in a direction transverse to the axis of rotation thereof.

References Cited in the file of this patent

UNITED STATES PATENTS

| | | |
|---|---|---|
| 541,188 | Tournier | June 18, 1895 |
| 1,282,743 | Brenkert et al. | Oct. 29, 1918 |
| 2,716,922 | Stephens | Sept. 6, 1955 |
| 2,973,689 | Bailey | Mar. 7, 1961 |

FOREIGN PATENTS

| | | |
|---|---|---|
| 409,300 | Great Britain | Aug. 25, 1934 |